(12) United States Patent
James

(10) Patent No.: US 6,932,323 B2
(45) Date of Patent: Aug. 23, 2005

(54) DROGUE HAVING BIASED END OPENING

(75) Inventor: Benjamin B. James, Birchrunville, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/899,347

(22) Filed: Jul. 26, 2004

(65) Prior Publication Data

US 2005/0017227 A1 Jan. 27, 2005

Related U.S. Application Data

(60) Provisional application No. 60/490,038, filed on Jul. 24, 2003.

(51) Int. Cl.[7] .................................................. H02G 1/08
(52) U.S. Cl. ............................. 254/134.4; 254/134.3 FT
(58) Field of Search ....................... 254/134.4, 134.3 R, 254/134.3 FT, 134.3 SC

(56) References Cited

U.S. PATENT DOCUMENTS

| | | |
|---|---|---|
| 1,033,587 A | 7/1912 | Hodgman |
| 1,035,994 A | 8/1912 | Mueller |
| 1,036,114 A | 8/1912 | Hodgman |
| 1,620,788 A | 3/1927 | Thompson et al. |
| 1,851,435 A | 3/1932 | Jessup |
| 4,498,659 A | 2/1985 | Brockelsby, III ........ 254/134.4 |
| 4,596,381 A | 6/1986 | Hamrick ................. 254/134.4 |
| 4,715,747 A | 12/1987 | Behrens .................. 405/303 |
| 5,121,644 A * | 6/1992 | Grey et al. ............... 73/865.9 |
| 5,906,357 A | 5/1999 | Munson, Sr. ............ 254/134.4 |
| 2004/0079929 A1 * | 4/2004 | Delaforce et al. ....... 254/134.4 |
| 2005/0017227 A1 * | 1/2005 | James .................... 254/134.4 |

* cited by examiner

*Primary Examiner*—Lee D. Wilson
(74) *Attorney, Agent, or Firm*—Synnestvedt & Lechner LLP

(57) ABSTRACT

A drogue for drawing an elongated item through a conduit is disclosed. The drogue includes a flexible bag having a closed end and an oppositely disposed end opening. Shroud lines attached to the bag at the end opening allow attachment of the drogue to the item. A biasing member, preferably in the form of a continuous loop of flexible, resilient interconnected wire legs, is attached to the bag and positioned proximate to the end opening. The loop engages the bag over a portion of its length and biases the end opening into an open configuration to prevent its collapse and loss of pneumatic pressure as it is propelled through the conduit.

30 Claims, 3 Drawing Sheets

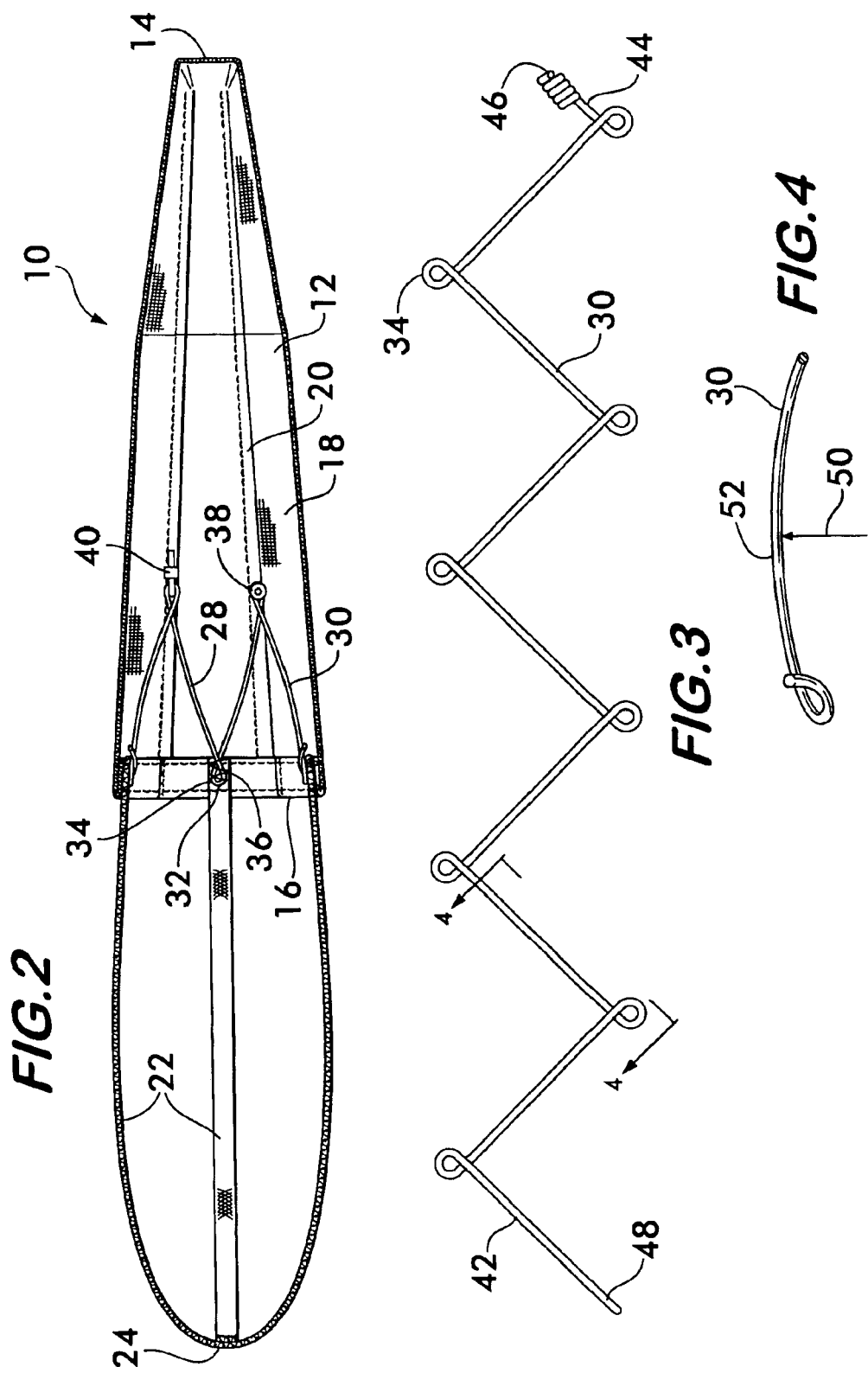

DROGUE HAVING BIASED END OPENING

FIELD OF THE INVENTION

This invention relates to pneumatically inflated drogues for drawing lines and other elongated items through conduits.

BACKGROUND OF THE INVENTION

Communication networks for voice communication, data links for computer systems, as well as remote sensing and control systems, often require that communication lines linking various nodes of the system be drawn through extensive lengths of conduit between the nodes. The conduit defines a path for the communication network and may be buried underground or may be positioned throughout a building or other structure. Access to the conduit is typically afforded only at isolated points where connections are made to system nodes. The conduit often has one or more bends as sharp as 90° which the communication lines must negotiate, as well as horizontal, vertical and angled segments of various lengths. Obstructions, in the form of other communication lines, are also often present within the conduit.

The communication lines to be drawn through the conduit may include, for example, simple wires, wiring harnesses, coaxial cable or optical fiber bundles. Other elongated items such as flexible sleeves for protecting the communication lines are also drawn through the conduit. Such protective sleeves often have pull cords pre-positioned within them for later drawing communication lines though the sleeve. As these lines and sleeves cannot be pushed through the conduit, it is found advantageous to draw them through the conduit by first drawing a high-strength pull cord in the form of a tape through the conduit, attaching the tape to the item to be drawn through the conduit, and drawing the item by pulling the tape.

The tape may be pneumatically drawn through the conduit by attaching it to a small parachute-like drogue, positioning the drogue within the conduit and forcing compressed air into the conduit behind the drogue. The drogue is inflated by the compressed air, preferably so that it fills the conduit. The differential pressure within the conduit which results from the inflated drogue will drive it through the conduit, the drogue drawing the pull tape along with it.

Unfortunately, parachute-like drogues, being fabric membranes, often collapse when negotiating bends such as elbow joints or obstacles within the conduit. Once collapsed, the differential pressure is lost and forward progress of the drogue, and its tape are halted. It can be very difficult to re-inflate a drogue which deflates deep within the conduit. The drogue must be drawn back to its starting point, re-inflated and another attempt made to negotiate the conduit. This process may be repeated many times before success is achieved, if at all. There is clearly a need for a device which can reliably negotiate conduit having bends and obstacles for positioning communication lines, as well as other elongated items such as protective sleeves.

SUMMARY OF THE INVENTION

The invention concerns a drogue for drawing an elongated item through a conduit. The drogue comprises a flexible bag having an end opening. The end opening allows the drogue to be inflated and pneumatically propelled along a conduit. The elongated item is attachable to the bag at the end opening, preferably by a plurality of shroud lines attached to the bag.

A biasing member, preferably in the form of a flexible resilient wire loop, is attached to the bag and positioned proximate to the end opening. The biasing member engages the bag over a portion of its length and applies a biasing force outwardly, thereby biasing the end opening into an open configuration which allows the drogue to fill the conduit and be readily inflated.

The biasing member is, however, resiliently yieldable towards a collapsed configuration wherein the bag's end opening is substantially closed in response to restricting forces experienced within the conduit. The biasing member acts to restore the end opening to an open configuration in the absence of restricting forces. This capability allows the drogue to negotiate bends and obstructions within the conduit. As the drogue encounters a bend or obstruction, the biasing member resiliently collapses to change the shape of the end opening sufficiently to allow it to pass by the obstruction or through the bend. Once beyond the bend or obstruction, the biasing forces of the biasing member expand the end opening to its full open configuration so that the differential pressure within the conduit is maintained and the drogue may continue on through the conduit.

Preferably, the bag takes the form of an elongated, tapered tubular member. The biasing loop preferably comprises a plurality of flexible, resilient legs interconnected to one another end to end. The legs are angularly oriented with respect to one another in a zig-zag pattern. A vertex is formed at each end of each leg joining the legs one to another. The legs are attached to the tubular member at a plurality of discrete attachment points positioned in spaced relation along the legs and around the end opening of the bag. Preferably, the attachment points coincide with the vertices. Individual loops are formed in the legs at each vertex to provide flexibility to the biasing loop and to facilitate its attachment to the bag.

BRIEF DESCRIPTION OF THE DRAWINGS

FIG. 2 is a longitudinal sectional view taken at line 2—2 of FIG. 1;

FIG. 3 is a detailed view of a biasing element before being formed into a biasing loop used with the drogue according to the invention;

FIG. 4 is a detailed partial view on an enlarged scale taken at line 4—4 in FIG. 3.

DETAILED DESCRIPTION OF THE EMBODIMENTS

Figure 1:
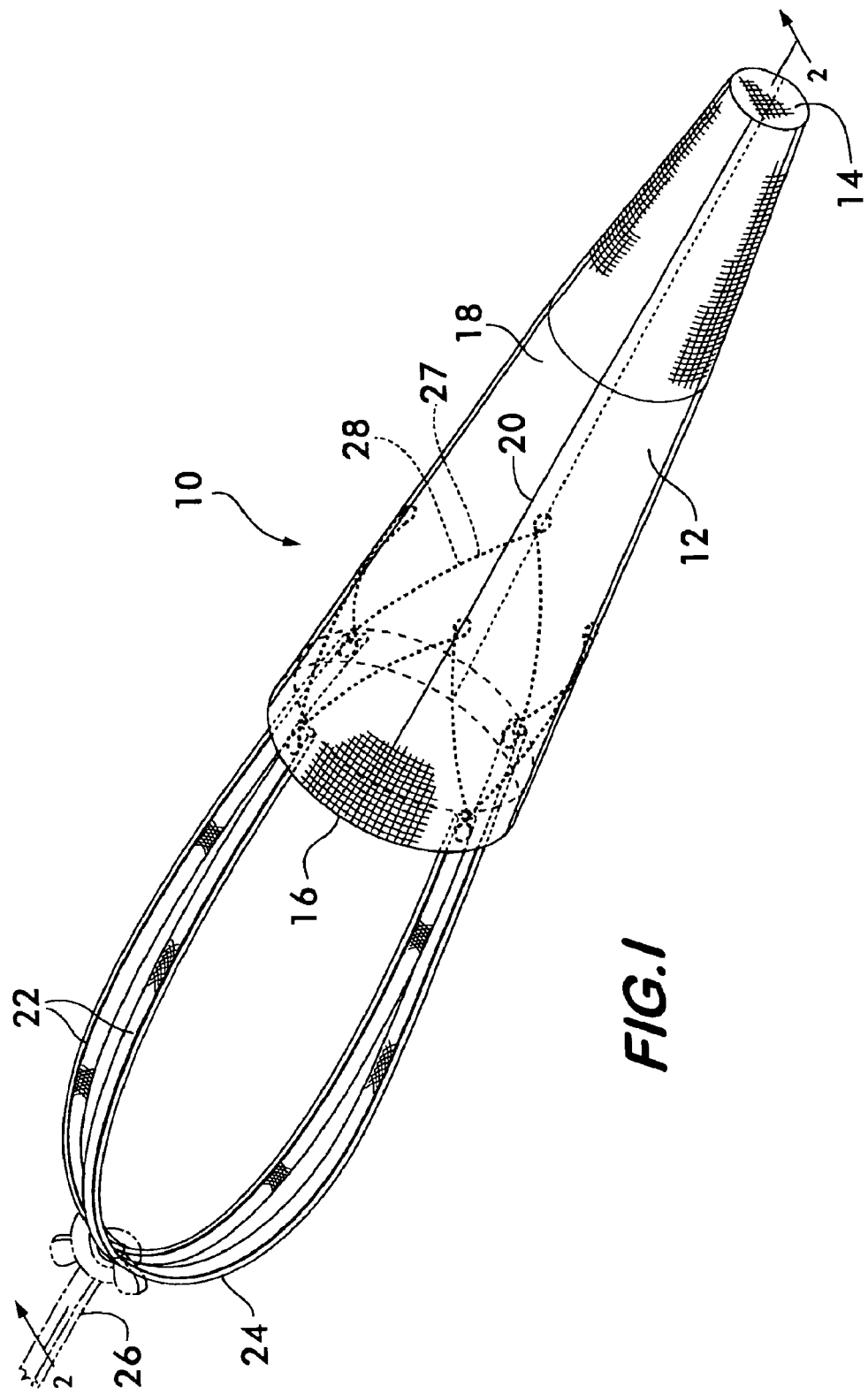
FIG. 1 is a perspective view of a drogue according to the invention.

FIG. 1 shows a drogue 10 according to the invention. Drogue 10 comprises a bag 12, preferably in the form of a flexible elongate tubular member, having a substantially circular cross section, a closed end 14 and an end opening 16. Preferably, the bag 12 is formed of a woven fabric such as nylon to provide flexibility, strength, toughness and abrasion resistance. Other materials are also feasible, including polyester and polyimides, as well as natural fibers such as cotton.

The bag 12 may be woven as a tube or constructed from triangular pieces 18 sewn together along seam lines 20. The fabric forming bag 12 has a weave density which is substantially fluid tight, allowing it to be pneumatically inflated as described below. Alternatively, the bag 12 may be formed from a continuous sheet material, such as expanded polytetrafluoroethylene, vinyl as well as other polymers capable of forming thin flexible sheets.

Figure 6:
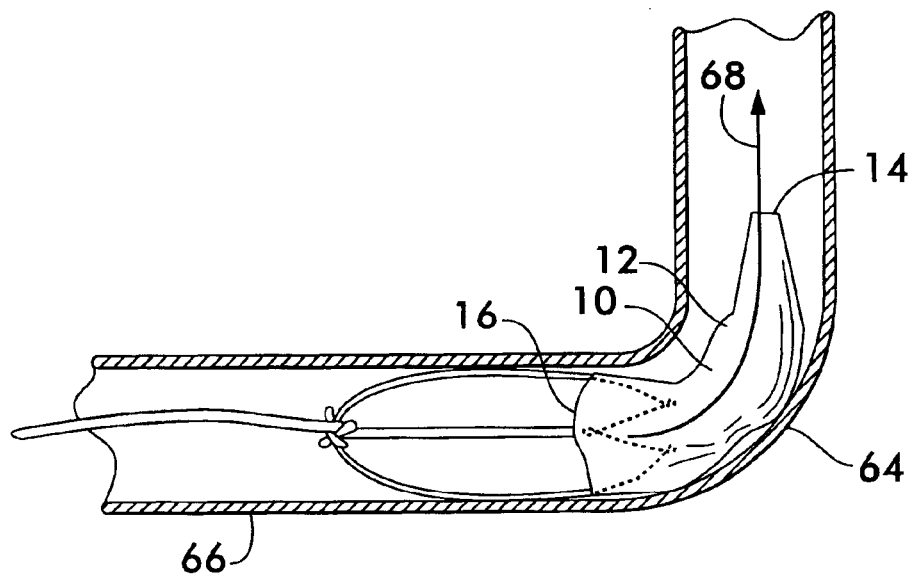

When bag 12 is in an open configuration, its end opening 16 preferably has a substantially circular cross-section and is sized to sealingly fit within a conduit (see FIG. 6). Bag 12 is preferably tapered or partially tapered lengthwise with the closed end 14 being smaller than the end opening 16.

Figure 5:
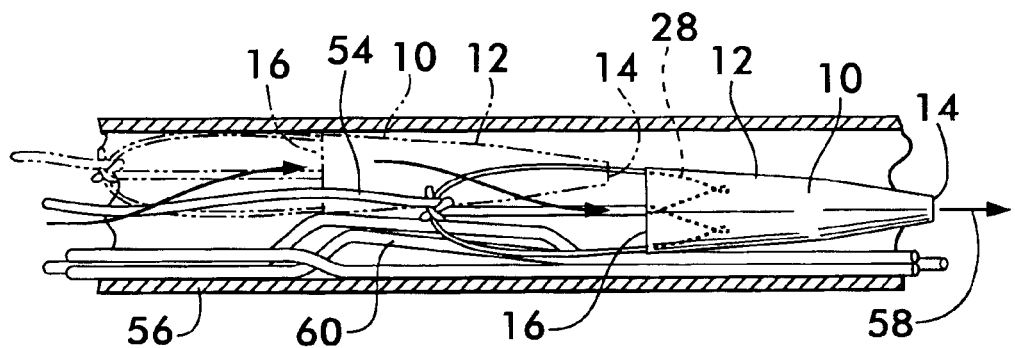
FIGS. 5 and 6 are side views showing the drogue in use within a conduit.

A plurality of shroud lines 22 are attached to bag 12 at the end opening 16. The shroud lines 22 preferably extend from the end opening to form closed loops 24 to which a pull tape 26, a communication line (not shown), a protective sleeve (also not shown) or other elongated item may be attached. The shroud lines 22 preferably have a high tensile strength and may be attached to the bag 12 by sewing or using fasteners such as rivets. Multiple shroud lines 22 are preferred to more evenly distribute the tensile force to the end opening 16 occasioned when the drogue is inflated and drawing a line through a conduit as illustrated in FIG. 5.

As further shown in FIG. 1, a biasing member 27 is attached to the bag 12 and positioned proximate to the end opening 16. Biasing member 27 provides a means for biasing the end opening 16 outwardly into an open configuration. Biasing member 27 is, however, resiliently yieldable towards a collapsed configuration wherein the end opening of the bag 12 is substantially closed in response to restricting forces, as may be encountered within a conduit. The biasing member acts to restore the end opening 16 to an open configuration in the absence of restricting forces within the conduit as described in further detail below.

The engagement length between the biasing member 27 and the bag 12 may be between about ¼ to about ½ of the length of the bag, or the biasing member 27 may have a length approximately equal to the diameter of the end opening 16 over which it engages the bag 12. By limiting the engagement length between the bag 12 and the biasing member 27, a large portion of the bag remains flexible and readily bendable so as to facilitate negotiation of bends in the conduit as described below.

Biasing member 27 preferably takes the form of a flexible, resilient biasing loop 28. The biasing loop 28 extends substantially continuously around the end opening 16 and engages bag 12 over a portion of its length proximate to the end opening. Biasing loop 28 is preferably concentric with end opening 16 and positioned on the inside of the bag 12 to prevent the loop from snagging on obstructions as the drogue passes through a conduit.

The biasing loop 28 applies an outward biasing force around the bag 12 which acts to restore the end opening 16 into the open configuration as described above so that the bag will always be inflatable within the conduit. Biasing loop 28 is resilient and flexible and will resiliently yield, as described above, when negotiating obstructions or a bend. The biasing loop 28 also preferably biases the end opening 16 into sealing contact with the conduit to help maintain the differential pressure propelling the drogue 10.

As shown in FIG. 2, the biasing loop 28 is preferably formed of a plurality of wire segments 30 connected end to end in a zig-zag pattern. Being angularly oriented relative to one another, each segment 30 meets its neighboring segment at a vertex 32. Preferably, the wire segments are substantially continuous and a wire loop 34 is formed at each vertex 32. Wire loops 34 increase the flexibility of the biasing loop 28, allowing it to collapse to a substantially flat configuration. The wire loops 34 provide stress relief by lowering the stresses in the wire segments when they bend as the biasing loop 28 deforms. The wire loops 34 also provide a plurality of discrete points at which the biasing loop 28 may be conveniently attached to the bag 12. The wire loops 34 may be sewn to the bag 12 as shown at 36, attached using fasteners such as rivet 38, or using a self locking strap 40 such as a "tie wrap" which passes through both the wire loop 34 and the fabric of the bag 12.

FIG. 3 illustrates a method of forming biasing loop 28. An elongated wire 42 is bent into a zig-zag shape defining wire segments 30 separated from one another by wire loops 34. One end 44 of the wire 42 is formed into a socket 46 by forming multiple turns of the wire 42, the elongated wire 42 is curved back upon itself and the other end 48 is inserted into the socket 46.

Elongated wire 42 is preferably music wire although other resilient metals having a high yield strength and modulus of elasticity, such as stainless steel, are also feasible. As shown in FIG. 4, each wire segment 30 is preferably curved and has a radius of curvature 50 sized to support the bag 12 in a substantially circular shape over a region proximate to the end opening 16. The curvature of wire segments 30 is designed to match the natural curvature of the bag 12 and facilitate sealing between the drogue 10 and round conduits. The convex side 52 of the curved wire segment 30 faces outwardly from the biasing loop 28.

The length of each wire segment 30 may be approximately equal to the diameter of the end opening 16 of the bag 12, and the biasing loop 28 is sized so that its diameter, in an unstressed state, is about 50% greater than the diameter of the end opening. This relation between the diameter of the biasing loop 28 and the bag 12 ensures that the drogue 10 will always be biased toward the open configuration.

The preferred diameter of the wire may be chosen in proportion to the diameter of the end opening so that the stiffness of the biasing loop 28 increases in proportion to the cube root of the diameter of the bag 12. This relation provides a similar "feel" to the stiffness of drogues of various sizes so that the biasing force provided by the biasing loop 28 is strong enough to maintain the end opening 16 substantially open, yet flexible enough to allow the end opening to deform and accommodate obstructions or bends in the conduit in which the drogue 10 is deployed. For music wire, a preferred diameter is approximately equal to the cube root of the quotient of the diameter of the end opening divided by 34,000. The constant will be different for other types of wire and the formula will yield a different diameter wire.

FIG. 5 shows a drogue 10 pulling a line 54 through a conduit 56 in a direction indicated by arrow 58. Compressed air is forced into conduit 56 behind drogue 10, inflating it to substantially seal the conduit. Differential pressure on either side of the drogue 10 forces it to move through the conduit and draw the line 54 with it.

When, as shown in dotted line, drogue 10 encounters an obstruction, such as may occur when previously installed optical fiber cables 60 become twisted over one another and align abreast with each other, thereby reducing the space within conduit 56, contact between the obstruction and the drogue applies restricting forces to the drogue which tend to collapse the end opening 16. The biasing loop 28 within the drogue allows the end opening 16 to resiliently yield toward the collapsed configuration to accommodate the is obstruction, but the biasing forces generated by the biasing loop tend to restore the end opening 16 to the open configuration. This action keeps the bag 12 partially inflated and maintains a degree of differential pressure which continues to propel the drogue 10. The drogue is thus able to traverse the obstruction within the conduit 56.

The advantage obtained by tapering the bag 12 is clear as this feature allows the closed end 14 to find a narrowed path past the obstruction. Once past the obstruction, the biasing force of the biasing loop 28 again expands the end opening 16 of the bag 12 to its full diameter, as shown in solid line in FIG. 5.

FIG. 6 shows a drogue 10 traversing a bend 64 in a conduit 66. When the closed end 14 encounters the bend 64, restricting forces are applied to the bag 12, which, being unsupported by any biasing means at the closed end, bends and kinks in an effort to follow the air flow around the bend. Closed end 14 thus acts as a lead enabling the bag 12 to change direction in response to the bend in the conduit.

As the bag 12 further traverses the bend 64, the end opening 16 will also experience restricting forces which may tend to cause its collapse, but being biased by biasing loop 28, the end opening remains partially open, keeping the bag inflated and maintaining at least a partial differential pressure that continues to propel the drogue 10 around the bend 64. Once the drogue 10 is past the bend 64, the restricting forces engendered by contact with it are removed and the biasing loop 28 restores end opening 16 to its full diameter and the drogue 10 continues along the conduit in the direction of arrow 68.

The advantage of positioning the biasing means at the end opening 16 of the bag 12, as opposed to biasing the bag substantially along its entire length, is apparent when the drogue negotiates a bend. The bag 12, being stiffened over a substantial portion of its length only by the differential pressure within the conduit, is free to kink and bend as needed to guide the drogue 10 around the bend. Once the turn is initiated by the closed end 14, the biasing loop 28, positioned proximate to the end opening 16, deforms resiliently as needed to negotiate the bend and then restores the bag 12 to the open configuration once free of the bend.

Drogues according to the invention provide a device for pneumatically drawing lines through conduit without the need to repeat the effort due to failure of the device when traversing bends or obstructions common to conduit systems. This will save time and cost in the installation of communication systems.

What is claimed is:

1. A drogue for drawing an elongated item through a conduit, said drogue comprising:
    a flexible bag having an end opening, said end opening allowing said bag to be inflated and to be pneumatically propelled along said conduit, said elongated item being attachable to said bag at said end opening; and
    a biasing member attached to said bag and positioned proximate to said end opening, said biasing member applying a biasing force outwardly and thereby biasing said end opening into an open configuration, said biasing member being resiliently yieldable towards a collapsed configuration wherein said end opening of said bag is substantially closed in response to restricting forces within said conduit and acting to restore said opening to an open configuration in the absence of restricting forces within said conduit.

2. A drogue according to claim 1, wherein said biasing member engages said bag along a length between about ¼ to about ½ of said bag's length.

3. A drogue according to claim 1, wherein said biasing member engages said bag along a length approximately equal to a diameter of said end opening of said bag.

4. A drogue according to claim 1, further comprising a plurality of flexible shroud lines, each being attached to said end opening of said bag, said elongated item being attachable to said shroud lines.

5. A drogue according to claim 1, wherein said end opening of said bag has a substantially circular cross section when in said open configuration.

6. A drogue according to claim 1, wherein said bag comprises an elongated tube having a closed end opposite said end opening.

7. A drogue according to claim 6, wherein said tube is tapered, said tube being smaller at said closed end than at said end opening.

8. A drogue according to claim 1, wherein said biasing member comprises a flexible, resilient loop extending substantially continuously around a perimeter of said end opening.

9. A drogue according to claim 8, wherein said loop comprises a plurality of flexible, resilient legs interconnected to one another end to end.

10. A drogue according to claim 1, wherein said bag is substantially fluid-tight.

11. A drogue for drawing an elongated item through a conduit, said drogue comprising:
    a flexible elongated tubular member having a closed end and an end opening, said end opening allowing said tubular member to be inflated and pneumatically propelled along said conduit, said elongated item being attachable to said end opening; and
    a flexible, resilient biasing loop attached to said tubular member and extending around said end opening, said biasing loop applying a biasing force outwardly thereby biasing said end opening towards an open configuration, the resiliency of said biasing loop allowing collapse of said end opening upon application of collapsing forces applied to the tubular member and for resiliently restoring said end opening in the absence of said collapsing forces.

12. A drogue according to claim 11, wherein said biasing loop engages said tubular member along a length between about ¼ to about ½ of said tubular member's length.

13. A drogue according to claim 11, wherein said biasing loop engages said tubular member along a length approximately equal to a diameter of said end opening.

14. A drogue according to claim 11, wherein said tubular member has a substantially circular cross section when in said open configuration.

15. A drogue according to claim 11, wherein said tubular member is tapered lengthwise, said end opening having a larger diameter than said closed end.

16. A drogue according to claim 11, wherein said biasing loop is substantially concentric with said end opening.

17. A drogue according to claim 11, wherein said biasing loop is positioned within said tubular member.

18. A drogue according to claim 11, wherein said biasing loop comprises a plurality of flexible, resilient legs interconnected to one another end to end.

19. A drogue according to claim 18, wherein said legs are attached to said tubular member at a plurality of discrete attachment points positioned in spaced relation along said legs.

20. A drogue according to claim 19, wherein said attachment points are substantially coincident with said vertices joining said legs.

21. A drogue according to claim 20, further comprising a plurality of loops formed in said legs, one said loop being positioned at each of said attachment points.

22. A drogue according to claim 19, wherein said tubular member has a curvature in a region proximate to said end opening, said legs having a curvature between said attachment points substantially conforming to said curvature of said end opening region.

23. A drogue according to claim 18, wherein said legs comprise metal wire.

24. A drogue according to claim 18, wherein said legs are angularly oriented with respect to one another in a zig-zag pattern, a vertex being formed at each end of each said leg joining said legs one to another.

25. A drogue according to claim 24, further comprising a loop being formed in said legs at each said vertex.

26. A drogue according to claim 11, wherein said loop has an unrestrained nominal diameter approximately 50% greater than a diameter of said end opening of said tubular member.

27. A drogue according to claim 11, further comprising a plurality of flexible shroud lines, said shroud lines being attached to said end opening of said tubular member in spaced relation to one another, said elongated item being attachable to said shroud lines.

28. A drogue for drawing an elongated item through a conduit, said drogue comprising:

a flexible bag having an end opening, said end opening allowing said bag to be inflated and pneumatically propelled along said conduit, said elongated item being attachable to said end opening; and a biasing means attached to said bag and positioned proximate to said end opening, said biasing means for biasing said end opening outwardly into an open configuration, said biasing means being resiliently yieldable towards a collapsed configuration wherein said end opening of said bag is substantially closed in response to restricting forces within said conduit and acting to restore said end opening to an open configuration in the absence of restricting forces within said conduit.

29. A drogue according to claim 28, wherein said biasing means has a length between about ¼ to about ½ of said bag's length.

30. A drogue according to claim 28, wherein said biasing means has a length approximately equal to a diameter of said end opening of said bag.

* * * * *